United States Patent
Ha et al.

(10) Patent No.: US 6,914,891 B2
(45) Date of Patent: Jul. 5, 2005

(54) METHOD OF REMOTE MANAGEMENT OF MOBILE COMMUNICATION TERMINAL DATA

(75) Inventors: Nam Kyu Ha, Kyungki-Do (KR); Kyong Hee Kim, Seoul (KR); Jae Young Lee, Seoul (KR)

(73) Assignee: SK Teletech Co., Ltd., Seoul (KR)

( * ) Notice: Subject to any disclaimer, the term of this patent is extended or adjusted under 35 U.S.C. 154(b) by 811 days.

(21) Appl. No.: 09/758,098

(22) Filed: Jan. 10, 2001

(65) Prior Publication Data

US 2002/0126652 A1 Sep. 12, 2002

(51) Int. Cl.[7] .......................... H04M 3/00; H04Q 7/24
(52) U.S. Cl. ...................................... 370/338; 455/419
(58) Field of Search .................. 370/338; 379/335.05; 455/419, 557

(56) References Cited

U.S. PATENT DOCUMENTS

| | | | | |
|---|---|---|---|---|
| 5,046,082 A | * | 9/1991 | Zicker et al. | 379/903 |
| 5,377,326 A | * | 12/1994 | Murata et al. | 379/355.05 |
| 5,603,084 A | * | 2/1997 | Henry et al. | 455/419 |
| 6,112,103 A | * | 8/2000 | Puthuff | 455/557 |

* cited by examiner

*Primary Examiner*—Salvatore Canigialosi
(74) *Attorney, Agent, or Firm*—Bryan Cave LLP

(57) ABSTRACT

A method of entering and modifying user data of a mobile communication terminal in a physically remote manner is provided A call is made from a mobile communication terminal to a computer or from a computer to a mobile communication terminal. Here, if a typical voice call or a simple data service call is connected, necessary data cannot be entered into the right memory area of the mobile communication terminal where said data have to be stored. In the present invention, a separate remote data update mode is set up and data and commands for transmission and entry of data are transmitted and received in this mode. According to the present invention, such data which cannot be entered by users in a direct manner to a mobile communication terminal as animation data or image data which are used for display on mobile communication terminal screen, melody data which are used for a ring tone for mobile communication terminal, game programs which are useable in mobile communication terminal, etc., can possibly be entered in addition to personal information data such as speed dial numbers since users can manipulate a data manager program already installed in the computer and thereby enter data to a mobile communication terminal and further modify them.

8 Claims, 8 Drawing Sheets

[Fig.1]
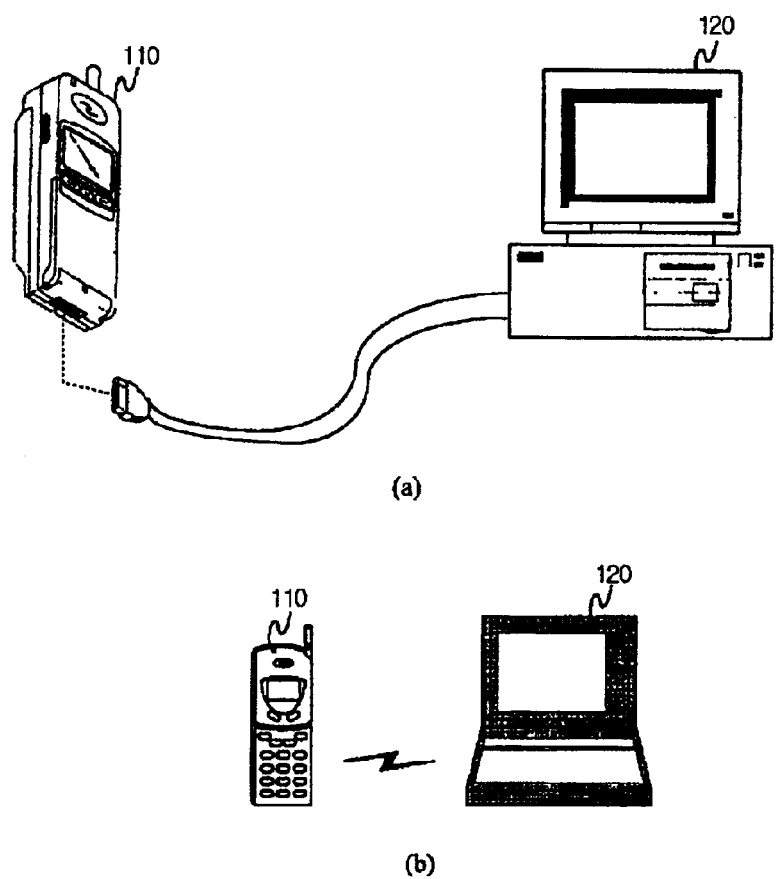
(a)
(b)
[Fig.2]
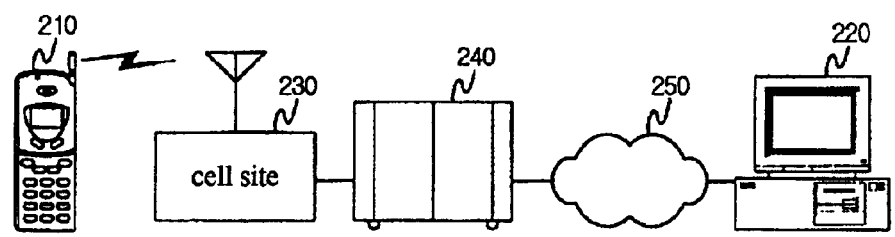

[Fig.3]
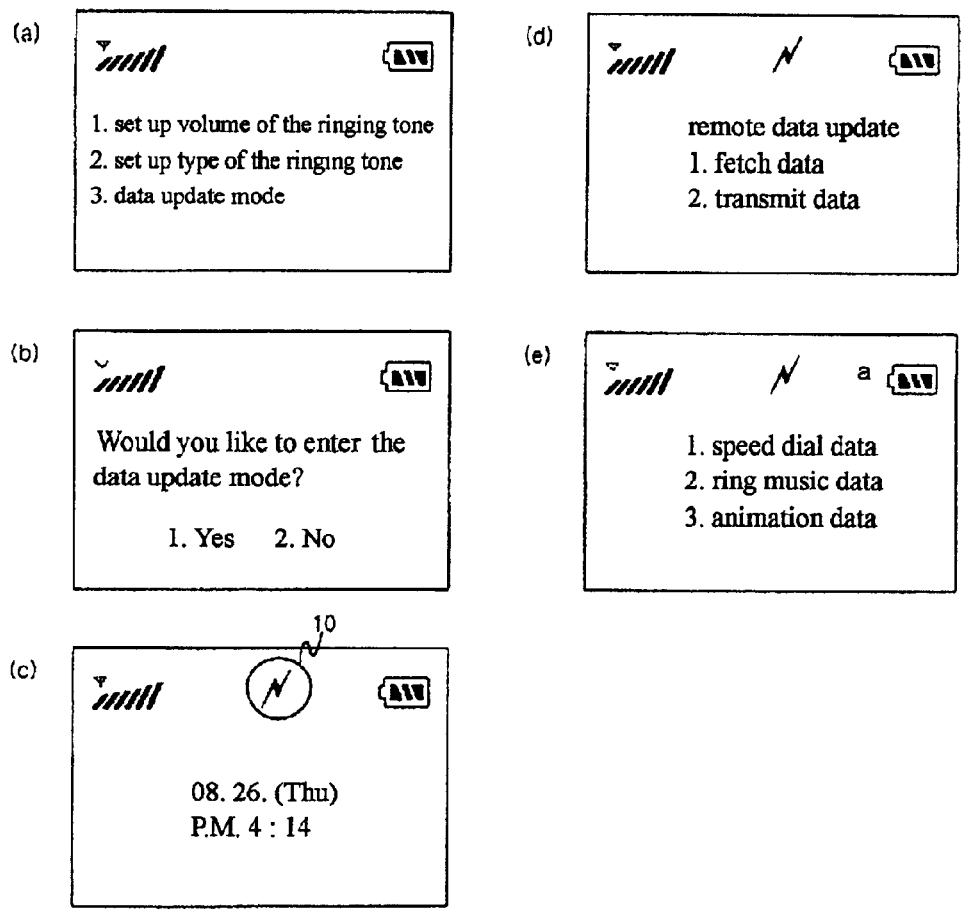
[Fig.4]
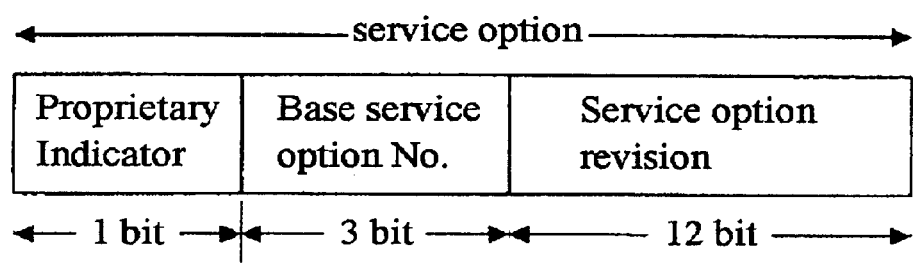

[Fig.5]
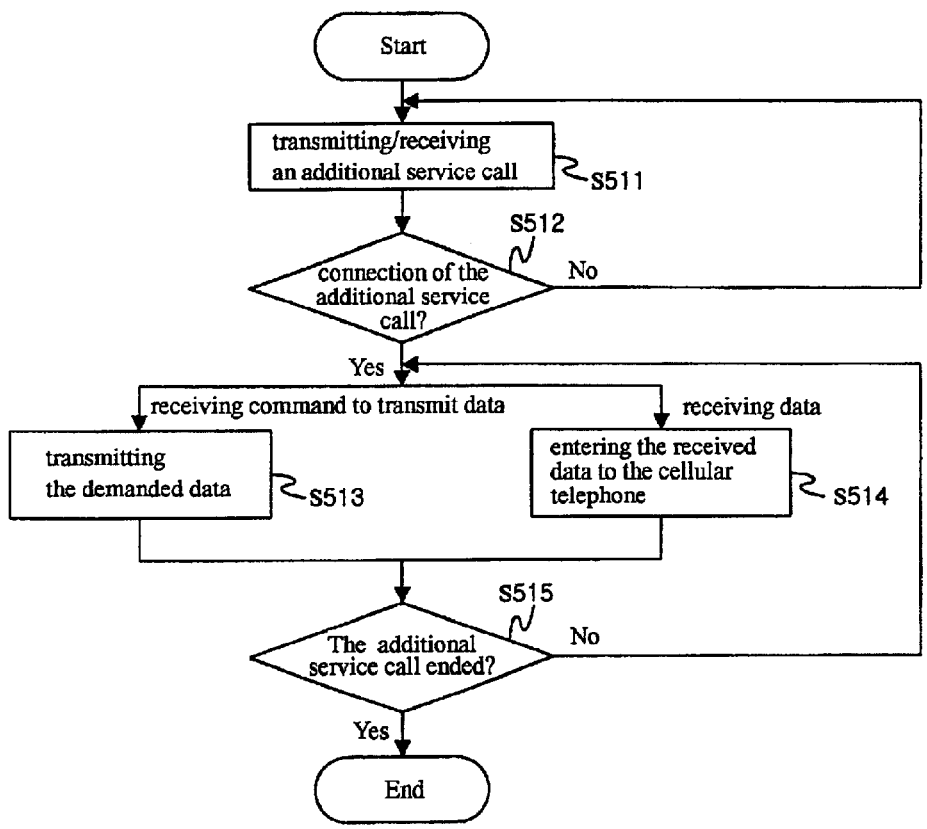
[Fig.6]
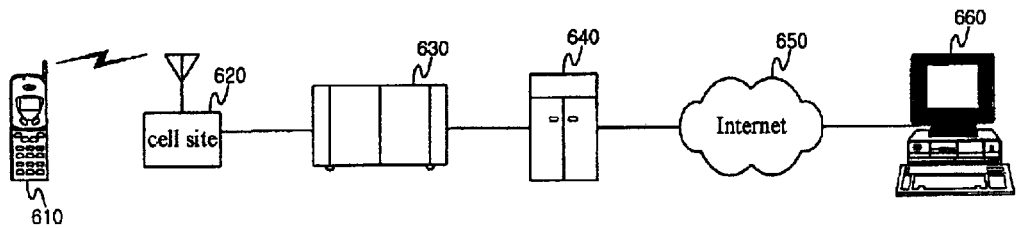

[Fig.7a]
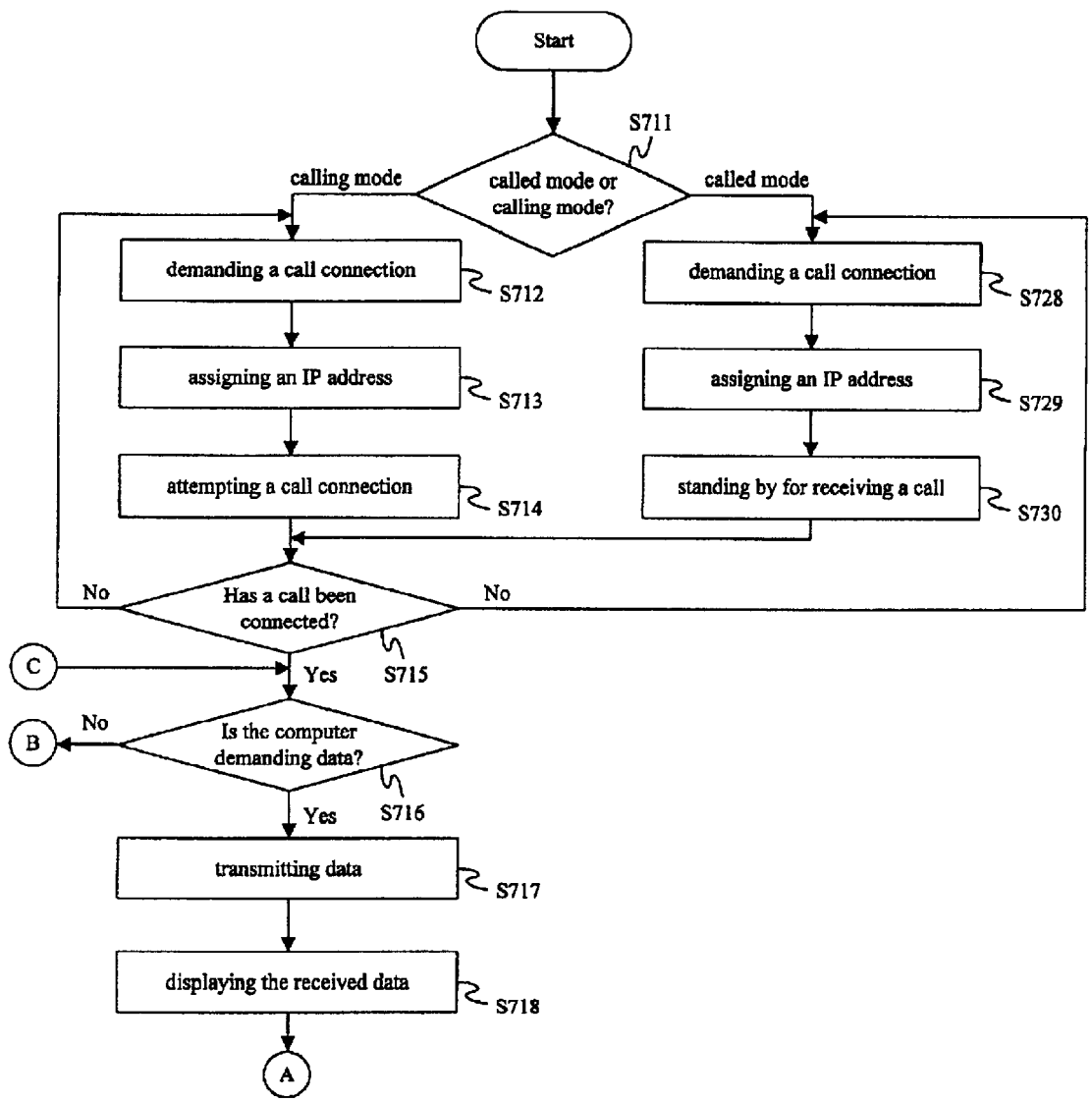

[Fig.7b]
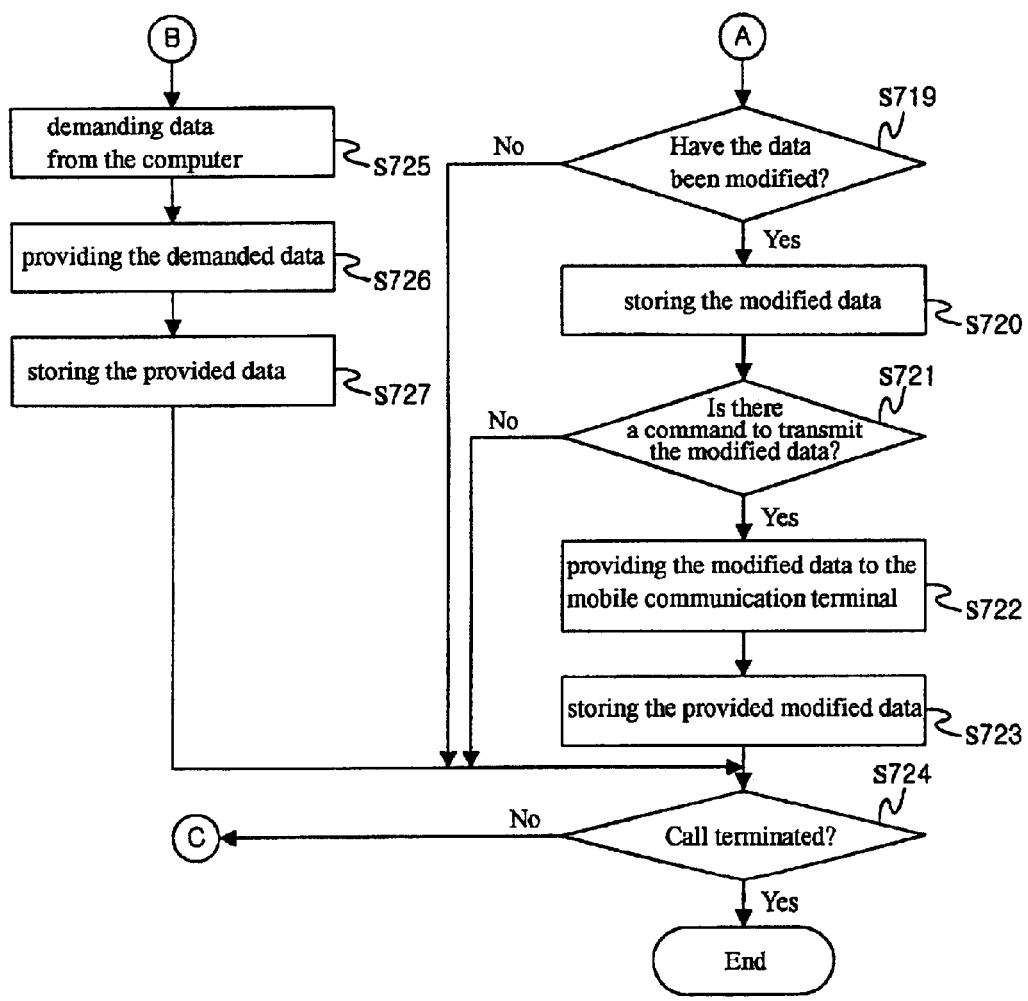

[Fig.8]
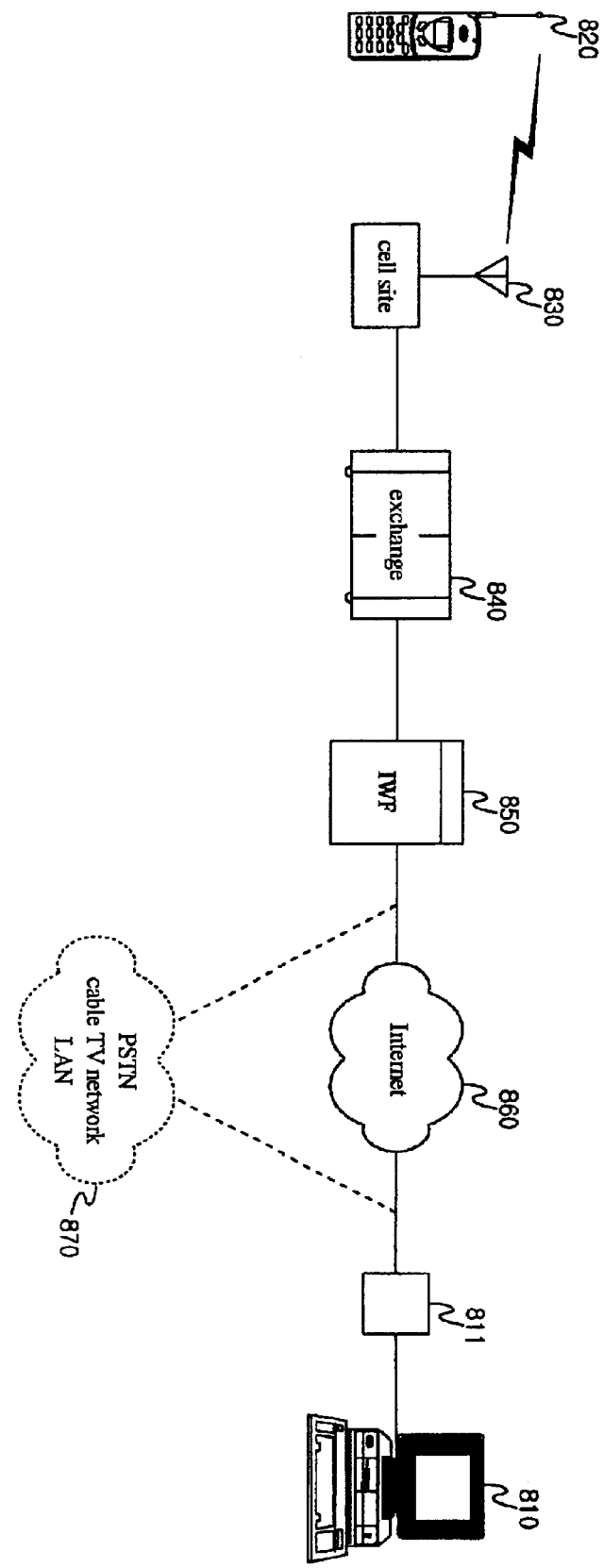

[Fig.9a]
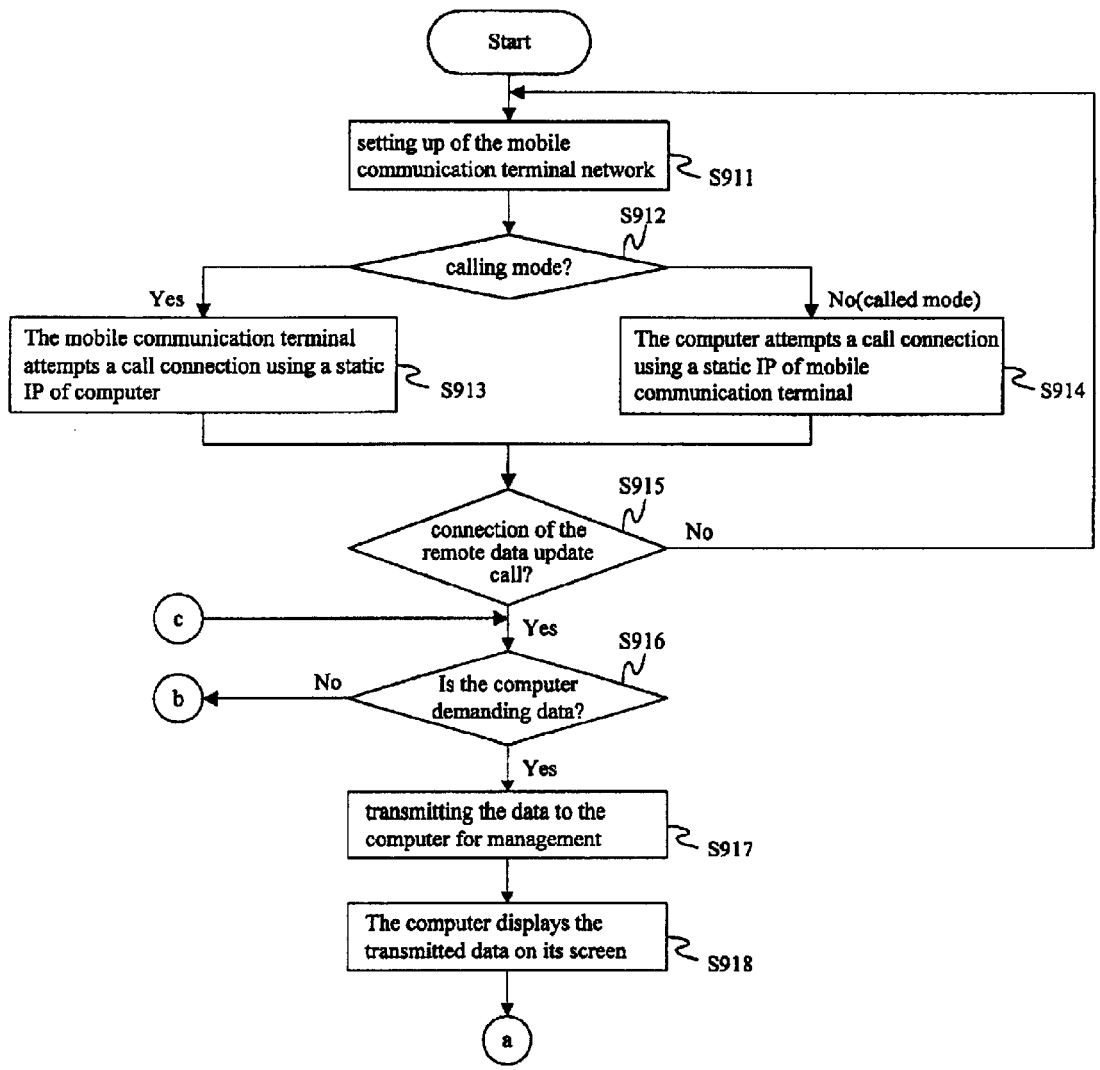

[Fig.9b]
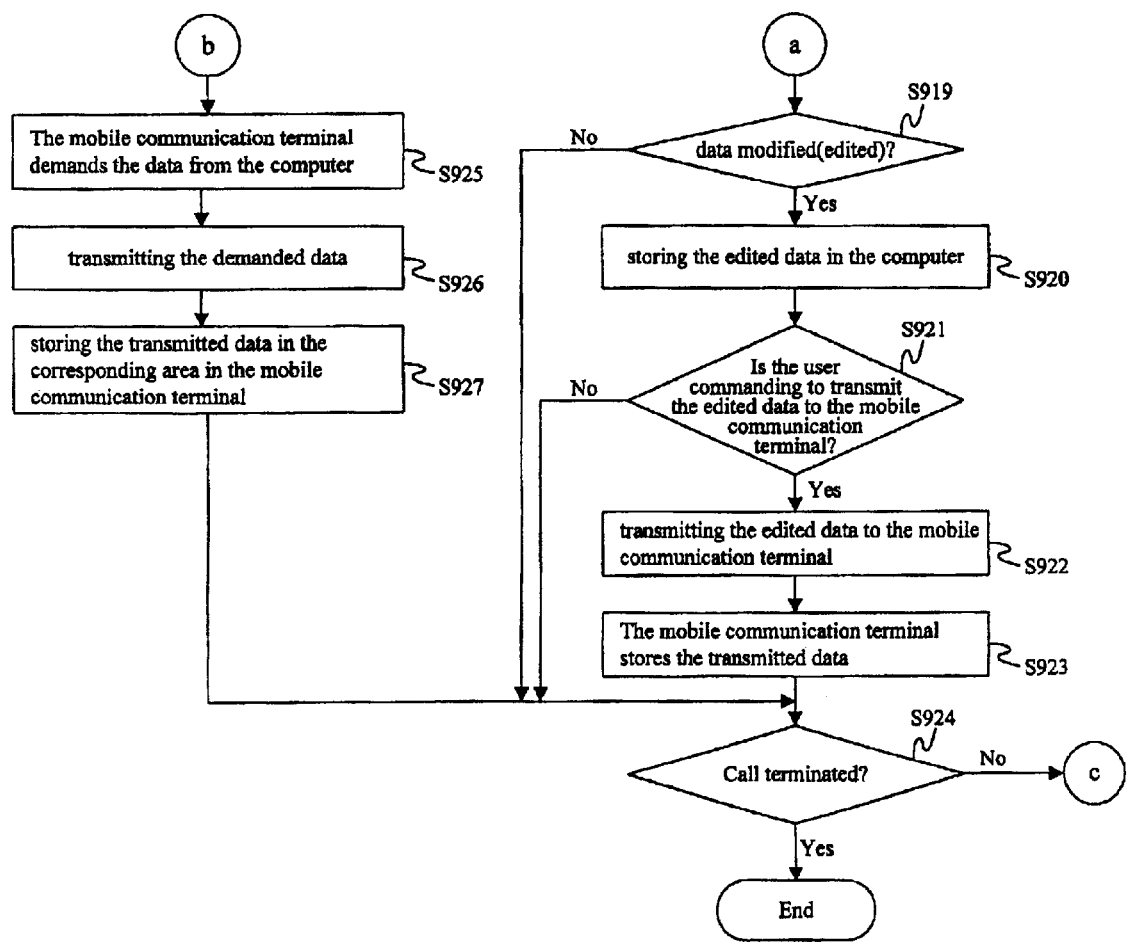

METHOD OF REMOTE MANAGEMENT OF MOBILE COMMUNICATION TERMINAL DATA

BACKGROUND OF THE INVENTION

1. Field of the Invention

The present invention relates to a method of remote management of mobile communication terminal data, in particular, to a method of entering and modifying user data of a mobile communication terminal using a computer in a physically remote position.

2. Description of the Prior Art

With the development of technology of memory devices and mobile communication terminals, user data storable in a mobile communication terminal are diversified and bulked. As for examples of user data that can be stored in a mobile communication terminal, there are telephone directory data in which frequently-dialed telephone numbers are stored, personal notebook data in which users' schedule or memorandum is stored, ring music data which enables users to select a music that he likes for his ring tone, etc.

As aforementioned, as user data storable in a mobile communication terminal are diversified and bulked, what is needed is an effective way to manage user data of a mobile communication terminal Namely, it is so inconvenient to use buttons of mobile communication terminal when entering such massive data and when it comes to buying a new mobile communication terminal, it is nearly impossible to enter user data to the new mobile communication terminal using buttons.

Conventionally, a data management program for entering and modifying user data is installed in a computer and user data are entered and modified using the management program.

However, in order to send data to a mobile communication terminal using the data management program installed in the computer, or, in order to send data stored in the mobile communication terminal to the computer, an In-Car Connector of the mobile communication terminal 110 should be connected to a communication port of the computer 120 using a communication cable, as illustrated in FIG. 1a. The communication port of computer 120 used herein may include RS-232C, USB port, etc.

The foregoing method suffered from a defect that a cable had to be connected for entering or modifying data and user data could not be transmitted from where there is no cable prepared, which caused much inconvenience.

As an alternative, there is a method of using an infrared communication port for transmitting data between the mobile communication terminal 110 and the computer 120, as illustrated in FIG. 1b. Use of this method can afford transmission of data without any cable, which is fairly convenient. This method, however, can be employed only if both the mobile communication terminal 110 and the computer 120 have an infrared communication port.

Further, this method also has a problem in that the computer 120 and the mobile communication terminal 120 should be within a predetermined distance from each other for employing this method. That is, if the mobile communication terminal 110 is physically located out of the predetermined distance from the computer 120, this method cannot be employed when entering or modifying data is necessary.

SUMMARY OF THE INVENTION

The present invention has been conceived by considering the foregoing, the object of which is to provide a method of remote management of mobile communication terminal data in which user data can be entered and modified without the need of connection of a communication cable between the mobile communication terminal and a computer.

It is another object of the present invention to provide a method of remote management of mobile communication terminal data in which user data can be entered and modified even if the mobile communication terminal and a computer are located distantly from each other.

It is a further object of the present invention to provide a method of remote management of mobile communication terminal data in which user data can be entered and modified by wireless connection through IP (Internet Protocol) address to a computer connected to the Internet network.

It is a further object of the present invention to provide a method of remote management of mobile communication terminal data in which user data can be managed by wireless connection of a desired mobile communication terminal through IP address to a computer connected to ADSL (Asymmetric Digital Subscriber Line) or LAN (Local Area Network).

It is a further object of the present invention to provide a method of remote management of mobile communication terminal data in which only a single click on a data management program installed in a personal computer (PC) can afford TCP/IP connection to a desired mobile communication terminal via the Internet and data from said mobile communication terminal can then be edited, stored and managed in said PC.

It is a further object of the present invention to provide a method of remote management of mobile communication terminal data in which a public static IP address is assigned to a mobile communication terminal and thereby connection between said mobile communication terminal and a PC via the Internet can be made with ease.

In order to input new data to a mobile communication terminal or modify the existing data, first, a call is made from a mobile communication terminal to a computer or vice versa. Here, if a typical voice call or a simple data service call is connected, desired data cannot be stored in a specific memory area of the mobile communication terminal where data should be stored. In the present invention, a separate remote data update mode is set up and data and commands for transmission and entry of data are transmitted and received in this mode. In this regard, the present invention provides three different methods of setting up a remote data update mode. According to the present invention, such data which cannot be entered to a mobile communication terminal in a direct manner as animation data or image data which are used for display on mobile communication terminal screen, melody data which are used for a ring tone for mobile communication terminal, game programs which are useable in mobile communication terminal, etc. can be entered in addition to personal information data such as speed dial number since users can manipulate a data manager program already installed in computer and thereby input data to a mobile communication terminal and further modify them. Further, a method of management of data using IP address is also provided by the present invention.

BRIEF DESCRIPTION OF THE DRAWINGS

FIG. 1 is a schematic diagram of conventional data management system for a mobile communication terminal.

FIG. 2 is a concept diagram for explaining a method of remote management of mobile communication terminal data according to the present invention.

FIG. 3 shows menus displayed on the screen of a mobile communication terminal when entering a remote data update mode which is employed by the present invention.

FIG. 4 shows a configuration of service option which is transmitted and received between a mobile communication terminal and the data management system pursuant to the present invention.

FIG. 5 is a flow chart for explaining a procedure carried out in a mobile communication terminal, in which personal data of the mobile communication terminal are entered and modified according to the present invention.

FIG. 6 shows a system configuration for management of data of a mobile communication terminal according to the present invention FIGS. 7a and 7b are flow charts of data management method for a mobile communication terminal using an IP address according to the present invention.

FIG. 8 shows a system configuration for management of data of a mobile communication terminal according to the present invention.

FIGS. 9a and 9b are flow charts of one click data management method for a mobile communication terminal using a static IP address according to the present invention.

DETAILED DESCRIPTION OF THE PREFERRED EMBODIMENT

Below, preferred embodiments of the present invention will be described in detail, making reference to the accompanying drawings.

<1. Management of data through telephone network>

FIG. 2 is a concept diagram for explaining a method of remote management of mobile communication terminal data according to the present invention.

Users can enter or modify personal data in his cellular telephone 210 using a data manager program installed in a computer 220 He can also transmit his personal data stored in the computer 220 to the cellular telephone 210 or transmit personal data to the computer 220 from cellular telephone 210.

For attempting to modify personal data in the cellular telephone 210, the data stored in the computer 220 have only to be modified and transmitted to the cellular telephone 210 in the event that the data stored in the computer 220 and the data stored in the cellular telephone 210 are identical with each other.

By the way, if the latest personal data is stored in the cellular telephone 210 only by having entered said data while using the cellular telephone 210 or by whatever, said personal data should first be downloaded from the cellular telephone 210 to the computer 220 and then re-transmitted to the cellular telephone 210 after modification in the computer 220.

Transmission of personal data from the computer 220 to the cellular telephone 210 or from the cellular telephone 210 to the computer 220 is carried out via a mobile communication terminal exchange 240, a cell site 230, and telephone network 250 using a modem (conventional modem or wireless modem using another mobile communication terminal).

Next, three different methods of transmitting personal data between the cellular telephone 210 and the computer 220 will be described in the following:

In order to transmit personal data between the mobile communication terminal 210 and a conventional telephone (modem) or other mobile communication terminal (wireless modem), it should be recognized at the time of call connection that a remote data update call, not a simple data service call, has been connected.

To elaborate, in order for the computer 220 to enter personal data to the cellular telephone 210 or modify them after connecting to the cellular telephone 210 in a wireless manner, a call is made from the cellular telephone 210 to the computer 220 or from the computer 220 to the cellular telephone 210. Here, the connection mode should be neither a simple voice call mode nor a data service call mode but a separate remote data update call mode so as to transmit data stored in a specific memory area of the mobile communication terminal 210 to the computer 220 or enter data stored in the computer 220 to a specific memory area of the mobile communication terminal 210.

This is because it is impossible to transmit data if the connection mode is the voice call mode, and further, in case of a simple data service call mode, only a route for transmission of data is generated between the computer 220 and the mobile communication terminal 210 and hence data transmitted to the mobile communication terminal 210 from the computer 220 cannot be stored in the right memory area of the mobile communication terminal 210. In case of speed dial data, for example, desired speed dial data are not to be stored in the area where speed dial data should be stored.

Accordingly, the present invention provides three different methods in each of which it can be recognized that a remote data update call has been connected <1.1 First Method>

In the first method, the calling party and the called party both enter the remote data update mode before the call is connected.

To elaborate, in order to make a call from the mobile communication terminal 210 to the computer 220, the mobile communication terminal 210 which is the calling party first selects the remote data update mode before making a call and the computer 220 which is the called party selects the remote data update mode by executing data manager program for receiving the call.

To the contrary, in order to make a call from the computer 220 to the mobile communication terminal 210, the computer 220 as calling party first executes data manager program and selects the remote data update mode before making a call and the mobile communication terminal 220 as called party sets up a remote data update reception mode for receiving the call.

In this way, both the calling party and the called party can recognize that the connected call is a remote data update call since both parties have already set up the remote data update mode, whereupon remote updating of data, to wit, remote entering and modifying of personal data can possibly be made.

The foregoing will be described in more detail with reference to the drawings FIG. 3 is an example of menus displayed on a mobile communication terminal screen when entering the remote data update mode.

Function of remote updating of data is provided to the mobile communication terminal 210 and users can then select the remote data update mode, as illustrated in FIG. 3a. If a user presses button 3 in FIG. 3a, the mobile communication terminal 210 asks the user if he wishes to enter the remote data update mode, as in FIG. 3b If the user selects number 1 to enter the remote data update mode, mobile communication terminal 210 returns to the idle state screen and an icon 10 indicating the remote data update mode is shown on the screen, as shown in FIG. 3c.

As in the foregoing, if a user makes or receives a call with the mobile communication terminal 210 at the remote data update mode, a remote data update call is connected to the mobile communication terminal 210 and thereby the user can fetch data from the computer 220 or send data to the computer, as illustrated in FIG. 3d.

FIG. 3e is an exemplary result of selecting "fetch data" in FIG. 3d. Users can fetch data stored in the computer 220 by selecting a desired menu among various menus.

A data manager program should be executed in the computer 220. Fetching data from a mobile communication terminal or sending data to a mobile communication terminal can possibly be carried out by the data manager program in a similar manner as in FIG. 3. Further, it is also possible to provide various editorial menus which can afford modification and edit of data.

In conclusion, mobile communication terminal data can be inputted, modified, and edited by connecting a call after the calling party and the called party have entered the remote data update mode.

<1.2 Second Method>

In the second method, the calling party sets up entry into the remote data update mode prior to connecting a call as in the first method but the called party does not need to set up such entry and instead is made to automatically enter the remote data update mode at the time of connecting a call.

In order for the called party to recognize that the call that is arriving is a remote data update call, the system should notify the called party that said call has been made at the remote data update mode while sending a ring signal to the called party after perceiving the remote data update call from the calling party. In this regard, the present invention has added an option for remote updating of data to service option data which are transmitted and received between the system and a mobile communication terminal.

FIG. 4 shows configuration of the service options which are transmitted and received between the system and a mobile communication terminal In the embodiments of the present invention, the fourth bit from the highest in the service option revision is assigned one(1) so as to represent the remote data update mode.

The following table shows the service options used for the conventional data service.

| CDMA Data Service | Service Option | Proprietary Indicator | Base Service Option Number | Service Option Revision | Speed |
|---|---|---|---|---|---|
| ASYNC (via IWF) | 0x0004 | 0 | 0 | 0x004 | 9.6 Kbps |
| | 0x1004 | 0 | 1 | 0x004 | 9.6(default)/14.4 Kbps |
| | 0x000C | 0 | 0 | 0x00C | 9.6/14.4 (default) Kbps |
| Qualcomm (no IWF) | 0x8003 | 1 | 0 | 0x003 | 9.6 Kbps |

The additional service options in the present invention are as follows:

| CDMA Data Service | Service Option | Proprietary Indicator | Base Service Option Number | Service Option Revision | Speed |
|---|---|---|---|---|---|
| ASYNC (via IWF) | 0x0104 | 0 | 0 | 0x104 | 9.6 Kbps |
| | 0x1104 | 0 | 1 | 0x104 | 9.6(default)/14.4 Kbps |
| | 0x010C | 0 | 0 | 0x10C | 9.6/14.4 (default) Kbps |
| Qualcomm (no IWF) | 0x8103 | 1 | 0 | 0x103 | 9.6 Kbps |

When a call is made, the calling party notifies the system using the additional service option that the call is an additional service call and the system further notifies the called party using the additional service option that the call is an additional service call. As such, this method cannot be used in case where either the calling party or the called party uses a conventional telephone. In other words, this method can be employed only when the calling party and the called party both are connected through a mobile communication terminal network. Namely, in case where the calling party is the mobile communication terminal 210 and the called party is the computer 220 using a wireless modem, or in case where the calling party is the computer 220 using a wireless modem and the called party is the mobile communication terminal 210, the present method can be employed.

<1.3 Third Method>

The third method is the same as the second method in that the calling party sets up entry into the remote data update mode prior to connection of the call and the called party is made to automatically enter the remote data update mode according to signal from the calling party. In the third method, however, the calling party notifies the called party of the remote data update call using In-Band Signal with no addition of new service option, while the second method adds new service option so as for the called party to automatically enter the remote data update mode and the system notifies the called party of the remote data update call using said additional service option when the calling party makes a call at the remote data update mode.

To elaborate, the calling party sets up entry into the remote data update mode prior to connection of the call, and after the call has been connected, the calling party sends the called party In-Band Command commanding the called party to enter the remote data update mode. When the called party receives said In-Band Command, the called party makes a response thereto and enters the remote data update mode. Such In-Band Command and the response thereto should conform to the In-Band Command format in ANSI/TIA/EIA-617 and an additional code is inserted therein.

Next, a procedure wherein a call is attempted at the remote data update mode using one of the above three methods and thereby personal data are inputted to the mobile communication terminal 210 and further modified using the computer 220 will be described in the following.

FIG. 5 is a flow chart for explaining the procedure in the mobile communication terminal 210, in which personal data are entered to the mobile communication terminal 210 and further modified according to the present invention.

First, a remote data update call is attempted from the mobile communication terminal 210 to the computer 220 or from the computer 220 to the mobile communication terminal 210 (Step S511) Here, one of the above three methods is used.

The mobile communication terminal 210 checks if the remote data update call has been connected after receiving or sending a remote data update call (Step S512) If the remote data update call has not been connected ("No" in Step S512), "receiving/sending of remote data update call" in Step S511 should be attempted again.

If connection of the remote data update call is confirmed ("Yes" in Step S512), the mobile communication terminal 210 transmits data stored in the mobile communication terminal 210 to the computer 220 according to commands of the data manager installed in the computer 220 or receives data from the computer 220 and then stores them in a corresponding memory area of the mobile communication terminal 210. An example of user operation has already been described hereinabove making reference to FIG. 3.

In order to modify data stored in the mobile communication terminal 210, the data stored in the mobile communication terminal 210 should first be fetched into the computer 220 and the data manager should display said data on the screen so as for the user to modify them. Accordingly, the data manager program sends the mobile communication terminal 210 a command to transmit data upon user's request for modification of specific data. Having received such command, the mobile communication terminal 210 transmits the requested data (Step S513).

In case where the user has inputted or modified data using the computer 220, he should transmit the inputted or modified data to the mobile communication terminal 210 and then store them in a corresponding memory area of the mobile communication terminal 210. Accordingly, if the user commands using the data manager program that data in the computer 220 should be updated for the mobile communication terminal 210, said data are transmitted to the mobile communication terminal 210 from the computer 220. The mobile communication terminal 210 stores data so received from the computer 220 in the right memory area in the mobile communication terminal 210 (Step S514).

In this way, necessary data can be inputted to mobile communication terminal 210 or further be modified using the computer 220 through Steps S513 and S514 until the remote data update call is terminated.

When the remote data update call is terminated ("Yes" in Step S515), entering and modifying of data using the computer is made terminated. The remote data update call can be terminated by keypad manipulation or by disconnection of the call upon request of the opposite party.

In the description hereinabove, personal data such as speed dials were mostly given as examples for such data which can be modified or inputted to a mobile communication terminal from a computer However, the allowable data are not restricted to personal data but rather diverse data can be inputted or modified by the advent of new functions or services. For example, such data which cannot directly be inputted to a mobile communication terminal as animation data or image data which are used for display on a mobile communication terminal screen, melody data which are used for a ring tone of a mobile communication terminal, game programs which are useable in a mobile communication terminal, or the like may be included and further there is no restriction to any specific category of data.

So far has been given a description of receiving and transmitting data between a mobile communication terminal and a computer but it is also possible to receive and transmit data between two mobile communication terminals. For example, the present invention can be applied to cases where a user replaces his mobile communication terminal with a new one or wishes to receive a ring tone from a mobile communication terminal of his friend's. Here, the operation procedure is the same as described above.

<2. Method Using IP Address>
<2.1 First Method>

FIG. 6 shows system connection for implementing a data management method for a mobile communication terminal using IP address according to the present invention. The system comprises a mobile communication terminal 610, a cell site 620, a mobile communication exchange 630, a data interfacing apparatus such as Inter Working Function 640 for interfacing the exchange to Internet, the Internet 650, and a computer 660.

As in FIG. 2, users can input desired personal data and service data to the mobile communication terminal 610 or modify the stored data by executing a data manager program installed in the computer 660 through the system illustrated in FIG. 6. Further, the personal data or other data stored in the mobile communication terminal 610 can be provided wirelessly to the computer 660 via Internet 650

In the present invention, however, the mobile communication terminal 610 and the computer 660 are connected not through a telephone network as in FIG. 2 but through Internet 650. To this end, the mobile communication terminal 610 should be assigned an IP address from the Inter Working Function 640.

Under such system as aforementioned, a process in which user data of a mobile communication terminal are managed according to the present invention will be described below in a more specific manner.

First, an additional service call is attempted from the mobile communication terminal 610 to the computer 660 or from the computer 660 to the mobile communication terminal 610 Then, the Inter Working Function assigns an IP address to the mobile communication terminal 610.

After assignment of an IP address to the mobile communication terminal 610, the mobile communication terminal 610 is connected to the IP address of the computer 660.

After the mobile communication terminal 610 is connected to the computer 660, an additional service is provided in the following way.

The mobile communication terminal 610 transmits data stored in the mobile communication terminal 610 to the computer 660 according to command from the data manager program installed in the computer 660 or stores data in a corresponding memory area of the mobile communication terminal 610 after receiving data from the computer 660.

In order to modify data stored in the mobile communication terminal 610, said data should first be fetched into the computer 660 and displayed on the computer screen by the data manager program so as for the user to modify said data. Accordingly, the data manager program sends the mobile communication terminal 610 a command to transmit data upon user's request for modification of specific data. Having received such command, the mobile communication terminal 610 transmits the requested data.

In case where the user has inputted or modified data using the computer 660, he should transmit the inputted or modified data to the mobile communication terminal 610 and then stores them in the right memory area of the mobile communication terminal 610. Accordingly, if the user commands using the data manager program that data stored in the computer 660 should be updated for the mobile communication terminal 610, said data are transmitted to the mobile communication terminal 610 from the computer 660. The mobile communication terminal 610 stores data so received from the computer 660 in an appropriate memory area in the mobile communication terminal 610.

In this way, necessary data can be modified or inputted to the mobile communication terminal 610 using the computer 660 until the additional service call is terminated.

When the additional service call is terminated, entry and modification of data using the computer is also made terminated. The additional service call can be terminated by manipulation of keypad of the mobile communication terminal 610 or by disconnection of the call upon request of the opposite party.

FIGS. 7*a* and 7*b* are flow charts of a data management method for a mobile communication terminal using an IP address according to the present invention and this method is applied to the system illustrated in FIG. 6. To repeat, FIGS. 7*a* and 7*b* show a process in which user data edited in the computer 660 are wirelessly provided to the mobile communication terminal 610 through Internet 650.

In order to carry out such process, a user should first manipulate a keypad to set up an additional service mode in the mobile communication terminal 610 for a user data service. As for additional service modes set up herein, there are a calling mode at which the mobile communication terminal 610 demands connection to the computer 660 and a called mode at which the mobile communication terminal 610 receives demand from the computer 660 for connection.

When an additional mode has been set up by the user, the mobile communication terminal 610 checks if the mode set up is the calling mode or the called mode (S711). If the mode is the calling mode, the mobile communication terminal 610 demands a call connection to the computer 660 through Internet 650 for the additional service (S712) and the Inter Working Function 640 then assigns an IP address required for connection of a call to the mobile communication terminal 610 (S713) and connection of the mobile communication terminal 610 to the IP address of the computer 660 is attempted (S714).

The mobile communication terminal 610 checks if a call connection has successfully been made or not (S715). If the call has not been connected, the process of requiring a call connection (S712) is attempted again. If the call has been connected, the mobile communication terminal 610 checks if there is a demand for data from the computer 660. If data are demanded, the mobile communication terminal 610 transmits the demanded data to the computer 660 (S717). Here, the computer 660 demands data according to user's instruction.

After the specific data stored in the mobile communication terminal 610 are received by the computer 660, the data manager program installed in the computer 660 displays the received data so as for the user to modify them (S718) Thereafter, the data manager program checks if the user has modified the data (S719) If the data have been modified by the user, the computer 660 stores the modified data so as to transmit them to the mobile communication terminal 610 (S720). As such, the modified data are used for updating data stored in the mobile communication terminal 610

To elaborate, the computer 660 checks if there is a command from the user to transmit the modified data to the mobile communication terminal 610 (S721). If so, the computer 660 transmits the modified data to the mobile communication terminal 610 (S722) and the mobile communication terminal 610 stores said modified data in a specific memory area, thereby updating previous data (S723)

If user data of the mobile communication terminal 610 have been updated in such a way, the mobile communication terminal 610 or the computer 660 checks if there is a request of termination of the call from the opposite party (S724). If so, the call is terminated. If not, the process of confirming demand for data (S716) is attempted.

If no data have been modified in the process of determining data modification (S719), the computer 660 stops displaying data (S722) and passes to the process of determining call termination (S724). Further, if the user has not instructed to transmit data in the process of determining transmission of modified data (S721), the process of determining call termination is attempted (S724)

Further, in the process of confirming demand for data (S716), if no data have been demanded by the computer 660, the mobile communication terminal 610 demands desired data from the computer 660 (S725) and the computer 660 provides the mobile communication terminal 660 for the desired data in response thereto (S726).

Subsequently, the mobile communication terminal 610 stores data so provided by the computer 660 in the specific memory area (S727) and passes to the process of determining call termination (S724).

On the other hand, in the process of checking the additional service mode (S711), if the mode is the called mode, the computer 660 demands call connection to the mobile communication terminal 610 through Internet 650 (S728) and according to such demand, the Inter Work Function 640 assigns an IP address necessary for connection of a call to the mobile communication terminal 610 (S729).

Given an IP address as above, the mobile communication terminal 610 maintains the called mode for some time until the call is connected (S730) and then passes to the process of confirming connection of a call (S715) In the process of confirming connection of a call 715, if the call is not connected, the process of demanding a call connection (S728) is attempted again.

As described above, a mobile communication terminal and a computer are wirelessly connected through Internet in the present invention, and hence, ADSL modem or LAN can be used for connection of a mobile communication terminal to a computer.

In case of using ADSL modem to embody the present invention, a mobile communication terminal makes an IP connection to the IP address the service provider provides and the maximum speed of communication between the mobile communication terminal and a computer is the maximum speed of downlink of the mobile communication terminal.

In case of using LAN to embody the present invention, a mobile communication terminal makes an IP connection to the IP address of a computer linked to LAN and the maximum speed of communication between the mobile communication terminal and the computer is the maximum speed of downlink of the mobile communication terminal.

<2.2 Second Method>

FIG. 8 shows system connection to embody one click data management method for a mobile communication terminal using a static IP address according to the present invention, said system comprising a mobile communication terminal 820, a cell site 830, a mobile communication exchange 840, an Inter Working Function 850, the Internet 860, and a computer 810.

The mobile communication terminal 820 used herein should be considered in a comprehensive manner to include PCS, cellular phone, PDA, and HandHeld PC and the computer 810 which manages data should also comprehensively include a notebook computer equipped with a network connection device such as modem or LAN card as well as general personal computer.

Internet 860 implies a worldwide open computer network providing TCP/IP protocol and higher level service such as HTTP (HyperText Transfer Protocol), Telnet, FTP (File Transfer Protocol), DNS (Domain Name System), SMTP (Simple Mail Transfer Protocol), SNMP (Simple Network Management Protocol), NFS (Network File Service), and NIS (Network Information Service).

On the other hand, Internet setup network 870 can mediate between the computer 810 and Internet 860. A conventional wired telephone network and a wired modem, a conventional wireless telephone network and a wireless modem, a cable TV network and a cable modem, ADSL network and ADSL modem, ISDN (Integrated Service Digital Network) and ISDN terminal, and LAN and LAN card, etc. are suitable for such Internet setup network but which is not restricted thereto.

Further, a data management program should be installed in the computer 810 and/or the mobile communication terminal 860 in order to receive data transmitted from the opposite party and store data inside in an appropriate form. Such a data management program should have an authorized static IP address of the opposite party and further should be equipped with a function in which TCP/IP connection to the opposite party's IP, not a voice call connection nor data communication call connection, can be attempted at a separate remote data update mode during transmission and reception of data subject to management. And, a data management program is embodied by software made by an appropriate programming language such as Visual C++, Visual Basic, Delphi, etc. but the programming language is not restricted thereto.

In order to carry out the data management method pursuant to the present invention, a separate remote data update mode should be embodied for connection of a remote data update call other than a simple voice call or data communication call This is because only a separate remote data update mode other than a simple voice call or data communication call enables data stored in a specific memory area of the mobile communication terminal to be transmitted to the computer or data transmitted from the computer to be stored in a specific memory area of the mobile communication terminal. In other words, data is impossible to transmit if the connection mode is a voice call. And if it is a simple data service call, only a route for transmission of data is generated between a computer and a mobile communication terminal and data transmitted to the mobile communication terminal from the computer cannot be stored in the right memory area of the mobile communication terminal (for example, in case of speed dial data, desired speed dial data cannot be stored in the memory area where speed dial data should be stored).

The mobile communication terminal 820 is assigned its own public static IP address. As the current 32 bit-based version 4 IP system (IPv4) has a limited number of IPs and static IP addresses cannot be assigned to small electronic goods or communication devices, most small Internet-compatible devices use an dynamic IP manner in which an IP is assigned whenever a connection is made. However, the version 6 IP system (IPv6) which is under development is based on 64 bit, thereby allowing use of $2^{64}$ IPs, to wit, $10^{19}$ IPs, so that the static IP manner can be used for mobile IP devices.

In a management program, a static IP address of the opposite party (computer or mobile communication terminal) can be installed and stored in an appropriate manner such as configuration setup Further, it is preferably required to provide a user interface of the program for a "connection button" requesting a call connection. When a user presses the "connection button" prior to or after editing data for management, the management program performs a setup process for Internet connection to the opposite party's device and recognizes opposite party's IP address so as to make an automatic connection, which is the gist of the present invention.

The Inter Working Function 250 transforms data inputted to the mobile communication exchange 840 so as to make them suitable for Internet transmission. In case that the opposite party's computer is connected to the Internet through conventional telephone network (PSTN), the Inter Working Function 250 operates as a modem and in case that the opposite party's computer is connected to the Internet through IP network, the Inter Working Function 250 operates as a kind of router.

The connection method between a computer and a mobile communication terminal, namely, data transmission protocol is preferably based on TCP/IP. The connectionless UDP (User Datagram Protocol), etc. can also be used for data transmission on the Internet but TCP/IP is preferred because TCP/IP can secure reliability of data transmission by using data acknowledgement and retransmission, etc.

FIGS. 9a and 9b are flow charts of one click data management method for a mobile communication terminal using a static IP address according to the present invention and are applied to the system illustrated in FIG. 8

In order to make a mobile communication terminal connected to the Internet for transmitting and receiving data for management, the mobile communication terminal makes a PPP (Point-to-Point Protocol) setup with the Inter Working Function using a public static IP address assigned to the mobile communication terminal itself (S911). Next, if it is a calling mode wherein the user demands connection to the computer using the mobile communication terminal, a remote data update call connection based on TCP/IP is demanded of the computer using the computer's static IP address already stored therein (S913) To the contrary, if it is a called mode wherein the user demands connection to the mobile communication terminal using the computer, said call connection demand is made by clicking the "connection button" in a management program of the computer (S914).

When a TCP/IP call connection has been made at the remote data update mode, the mobile communication terminal checks if there is a demand of data transmission from the computer (S916). If so, the mobile communication terminal transmits the demanded data (data subject to management) to the computer (S917), If not, the mobile communication terminal proceeds to the process of demanding data transmission (S925).

The computer displays data transmitted from the mobile communication terminal using the management program (and other application program) (S918) The computer checks if the displayed data have been modified by the user (S919) If the data have been modified, the modified (edited) final data are stored in a corresponding memory area in the computer (S920). Next, the computer checks if the user has commanded transmission of the edited data to the mobile communication terminal (S921). If there has been a command to transmit, the computer transmits said data to the mobile communication terminal (S922) and the mobile communication terminal stores the edited data transmitted in the corresponding memory area, thereby completing update of data (S923).

When data updating has been completed, it is checked if there is a demand of termination of the call (S924). If there is a demand to terminate the call, the call is terminated, and if not, the process proceeds to checking data transmission request from the computer (S316) since additional updating can possibly be made.

If no data have been edited or no command to transmit the edited data has been placed by the user, the process proceeds to confirming request of call termination (S324). On the other hand, if a demand to transmit data has not been received from the computer at the process of checking request of data transmission from the computer, the mobile communication terminal demands transmission of data from the computer (S925) and the computer transmits the demanded data to the mobile communication terminal (S926). The mobile communication terminal stores the transmitted data in a corresponding memory area and the process proceeds to confirming request of call termination (S927).

As seen in the foregoing, there are two possible ways for transmission of data and update of data according to where data are first transmitted from (that is, whether or not the computer demands data transmission), regardless of the mode of the mobile communication terminal (i.e. the calling mode or the called mode). In case where editing is made after connection of a call, data are typically first transmitted from the mobile communication terminal to the computer for display. In case where data are edited prior to connection of a call and a call connection is later made for transmission of the edited data to the mobile communication terminal, a direct transmission of data in the computer to the mobile communication terminal is preferred.

The data which can be modified/entered from the computer 810 to the mobile communication terminal 820 according to the present invention include such data which cannot be inputted to a mobile communication terminal using a keypad as animation data or image data which are used for display on a mobile communication terminal screen, melody data which are used for a ring tone for a mobile communication terminal, game programs which are useable in a mobile communication terminal, etc. in addition to personal information data such as speed dial numbers. Further, in case that the mobile communication terminal is such as PDA having function of personal data management, a variety of information, e g address directory, timetable, calendar, etc. can be encompassed.

As the present invention uses a static IP address and the Internet for connection of a mobile communication terminal and a computer as described above, computers which comprise ADSL modem or LAN card can be used to carry out the present invention in addition to computers comprising conventional wired modem and connected to PSTN.

In case of using ADSL modem, a mobile communication terminal makes an IP connection to IP address the ADSL service provider provides and in case of using LAN, a mobile communication terminal makes an IP connection to IP address of the computer linked to LAN and the maximum speed of communication between the mobile communication terminal and the computer is the maximum speed of downlink of mobile communication terminal.

While the present invention has been described herein with reference to specific examples of embodiment, those examples are intended to be illustrative only and are not to be deemed to limit the scope of the invention. To the contrary, it will be apparent to those of ordinary skill in the art that many changes, additions and/or deletions may be made to the disclosed embodiments without departing from the scope and spirit of the invention.

As can be seen in the above, the present invention generates the following effects by managing data of mobile communication terminal in a remote manner:

First, user data can be inputted and modified without connection of a communication cable between a mobile communication terminal and a computer.

Second, user data can be inputted and modified when a mobile communication terminal is physically distant from computer Third, such data which cannot be entered to a mobile communication terminal using a keypad as animation data or image data which are used for display on a mobile communication terminal screen, melody data which are used for a ring tone for a mobile communication terminal, game programs which are useable in a mobile communication terminal, etc. can be entered as well as personal information data such as speed dial number.

Fourth, user data of a mobile communication terminal can easily be inputted and modified through LAN in a business place or a school without additional purchase of a modem since user data are managed by connecting a mobile communication terminal and a computer with an IP address.

Fifth, user data of a mobile communication terminal can be managed at home with ease through a high-speed network such as ADSL.

Sixth, such computers which use LAN or ADSL service can be used in addition to the computers which access the Internet using a telephone number of its own and conventional telephone network since a mobile communication terminal and a computer are connected using a static IP address assigned to the mobile communication terminal and the computer in the Internet environment.

Seventh, a call connection between a computer and a mobile communication terminal can be made by just one click since a public static IP address is assigned and said IP address is stored in the data management computer, whereby the present invention has overcome such defect that a different IP address had to be entered at every connection due to assignment of an active IP address to the mobile communication terminal.

What is claimed is:

1. A remote management method of mobile communication terminal data using a system comprising a wireless communication network comprising a cell site and a mobile communication exchange, a mobile communication terminal, a computer for managing data of said mobile communication terminal, a data interfacing apparatus connected to Internet and to said wireless communication network for interfacing the exchange to Internet, in which said mobile communication terminal is assigned a public static IP address and the data management program installed in said computer has therein said public static IP address of said mobile communication terminal which said data management program manages and the method comprises:

the step of setting up a network wherein said mobile communication terminal makes a PPP (Point to Point Protocol) setup with the data interfacing apparatus using said public static IP address;

the step of making a call connection wherein TCP/IP session is formed between said mobile communication terminal and said computer using said public static IP address and the IP address of computer, upon user's request for connection; the step of checking for a demand for transmission of data from the computer and, if said demand is detected, confirming the demand for transmission;

the step of editing and storing data wherein, where the demand for said transmission is confirmed, the data transmitted from said mobile communication terminal are edited by the data management program in said computer and the edited final data are stored both in said computer and said mobile communication terminal; and the step of receiving and storing data wherein, where the demand for said transmission is not confirmed, the data transmitted from the computer using TCP/IP session are stored in said mobile communication terminal.

2. The remote management method of mobile communication terminal data as set forth in claim 1, in which a user's single clicking of corresponding button of said management program enables said TCP/IP call connection to be executed.

3. The remote management method of mobile communication terminal data as set forth in claim 1, in which said step of editing and storing data further comprises:

The first step wherein said mobile communication terminal transmits corresponding data to computer;

the second step wherein said computer displays the transmitted data so that the user can confirm and edit said transmitted data and the modified data can be transmitted to said mobile communication terminal if said data have been modified by said user;

the third step wherein said computer checks if the data have been modified or not, and if modified, said computer transmits the modified final data to said mobile communication terminal for storage upon user's instruction, and if not modified, the process proceeds to the following fourth step; and the fourth step wherein said mobile communication terminal or said computer checks if there is a demand from opposite party for termination of the call, and if there is a demand to terminate the call, the call is terminated, and if there is no such demand, the process proceeds to said step of confirming a demand from said computer for transmission of data.

4. The remote management method of mobile communication terminal data as set forth in claim 1, in which said step of receiving and storing data further comprises:

the first step wherein said mobile communication terminal demands desired data of said computer;

the second step wherein said computer transmits said data desired by said mobile communication terminal to said mobile communication terminal;

the third step wherein said mobile communication terminal stores said data transmitted from said computer in a predetermined memory area;

the fourth step wherein said mobile communication terminal and said computer checks if there is a demand from opposite party for termination of the call; and the fifth step wherein the call between said mobile communication terminal and said computer is terminated if there is a demand to terminate the call, and if there is no such demand, the process proceeds to the step of confirming a demand from said computer for transmission of data.

5. A remote management method of cellular telephone data in which a computer equipped with a modem and a data manager program is used, the method comprising the steps of:
- a cellular telephone entering a remote data update mode;
- a computer executing the data manager program and entering a remote data update mode;
- one of the computer and the cellular telephone making a call;
- where the computer makes said call, the cellular telephone answering the call;
- where the cellular telephone makes said call, the computer answering said call;
- the computer fetching and editing user data from the cellular phone and transmitting the edited data to the cellular phone; and
- the cellular telephone updating the user data stored in the cellular telephone with the data from the computer.

6. A remote management method of updating cellular telephone data using a computer equipped with a modem and a data manager program, the method comprising the steps of:
- a cellular telephone entering a remote data update mode;
- the cellular telephone making a call to a computer;
- a cellular telephone exchange sending a ring signal to the computer at the same time informing the computer that the calling mode is a remote data update mode by setting specific bit of service option data;
- the computer answering said call with the specific bit of service option data being set and entering a remote data update mode;
- the computer executing the data manager program and fetching and editing user data from the cellular phone; and
- the computer transmitting the edited data to the cellular phone and the cellular telephone updating the user data stored in the cellular telephone with the data from the computer.

7. A remote management method of updating cellular telephone data in which the method of transmitting and receiving user data between a first cellular telephone and a second cellular telephone, the method comprising the steps of:
- the first cellular telephone entering a remote data update mode;
- the second cellular telephone entering a remote data update mode;
- the first cellular telephone making a call to the second cellular telephone;
- the second cellular telephone answering the call with the specific bit of service option data being set and entering a remote data update mode; and
- one of the first and second cellular telephones fetching user data from the other one of the first and second cellular telephones and updating the user data stored in said one of the first and second cellular telephones with the data from the other of the first and second cellular telephones.

8. A remote management method of updating cellular telephone data by transmitting and receiving user data between a first cellular telephone and a second cellular telephone, the method comprising the steps of:
- the first cellular telephone entering a remote data update mode;
- the first cellular telephones making a call to the second cellular telephone;
- a cellular telephone exchange sending a ring signal from the first cellular telephone to the second cellular telephone at the same time informing the second cellular telephone that the calling mode is a remote data update mode by setting specific bit of service option data;
- the second cellular telephone answering the call with the specific bit of service option data being set and entering a remote data update mode; and
- one of the first and second cellular telephones fetching user data from the other of the first and second cellular telephones and updating the user data stored in said one of the first and second cellular telephones with the data from the other of the first and second cellular telephones.

* * * * *